United States Patent [19]

Takeuchi

[11] 4,275,441
[45] Jun. 23, 1981

[54] MICROPROGRAM CONTROL SYSTEM FOR MICROPROGRAM DEBUGGING

[75] Inventor: Hiroshi Takeuchi, Hachioji, Japan

[73] Assignee: Tokyo Shibaura Denki Kabushiki Kaisha, Kanagawa, Japan

[21] Appl. No.: 24,463

[22] Filed: Mar. 27, 1979

[30] Foreign Application Priority Data

Mar. 27, 1978 [JP] Japan ................................ 53/34244

[51] Int. Cl.³ .......................... G06F 9/22; G06F 11/32
[52] U.S. Cl. ........................................ 364/200; 371/19
[58] Field of Search ... 364/200 MS File, 900 MS File; 371/19

[56] References Cited

U.S. PATENT DOCUMENTS

| 3,415,981 | 12/1968 | Smith et al. ................ 364/200 X |
| 3,987,420 | 10/1976 | Badagnani ..................... 364/200 |

FOREIGN PATENT DOCUMENTS 51-142938 12/1976 Japan .
52-120638 10/1977 Japan .

OTHER PUBLICATIONS

Yamazaki et al., *Information Processing Society of Japan*, General Meeting 221.

*Primary Examiner*—Raulfe B. Zache
*Attorney, Agent, or Firm*—Stevens, Davis, Miller and Mosher

[57] ABSTRACT

In a microprogram control system of the type comprising an electronic computer having a programmable interruption control unit and a debugging microprogram executed during interruption which permits single step execution of a user's microprogram. When an interruption is desired, a next address of a program to be debugged is saved in a storage device. After executing the interruption the program operation is returned to a single step operation.

2 Claims, 6 Drawing Figures

F I G. 6
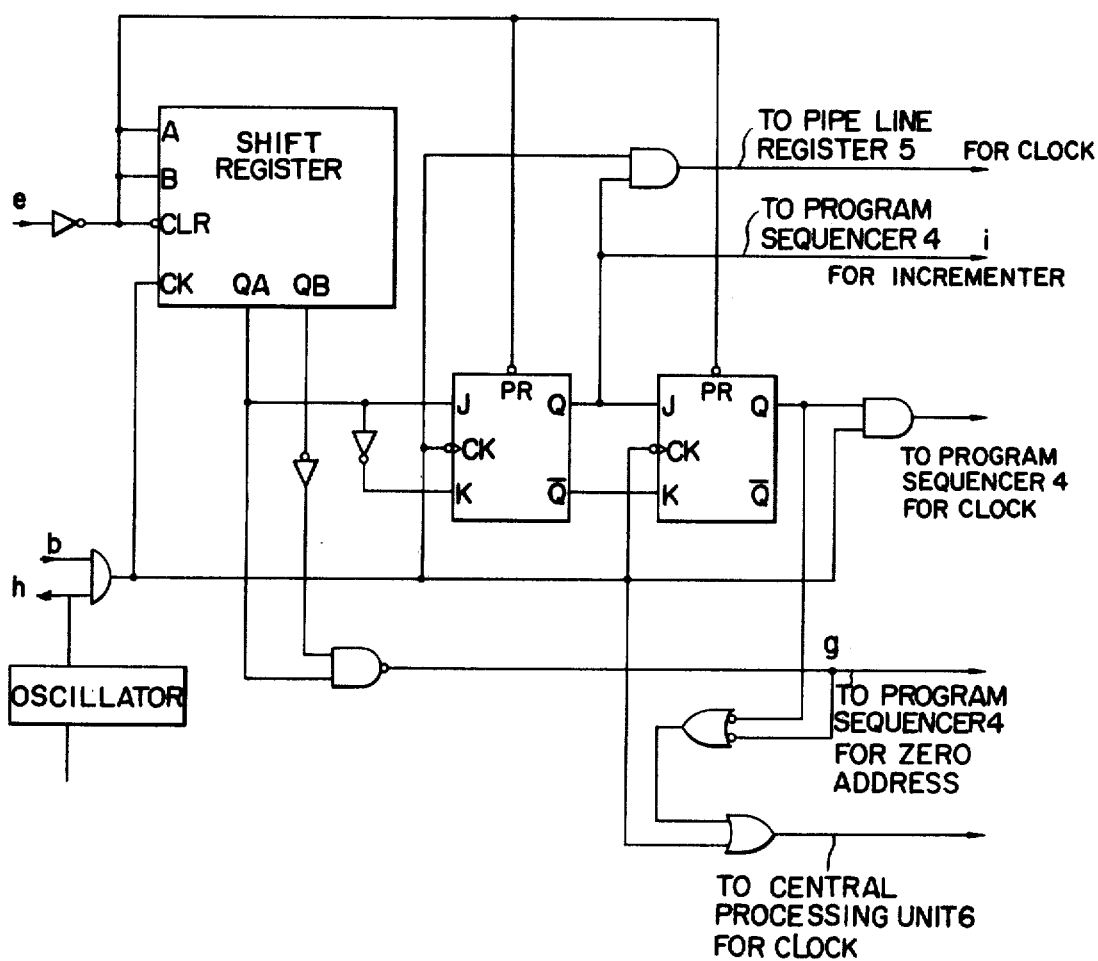

MICROPROGRAM CONTROL SYSTEM FOR MICROPROGRAM DEBUGGING

BACKGROUND OF THE INVENTION

This invention relates to a microprogram control system for microprogram debugging in which debugging of a microprogram can be readily performed, and more particularly to a system of debugging a data processing device in which a user program is written at microinstruction levels.

At first, it should be noted that the term "microinstruction" used herein does not mean higher level instructions with which conventional user programs are described, but means an instruction one level removed.

Generally an electronic computer is provided with a program memory device and a data memory device and a higher level instruction representing a user program is stored in the latter, while an instruction corresponding to one instruction of the user program and instructing more detailed computations and data processings are written into the former. In such a case, the program is called a microprogram in contrast to the higher level instruction.

Since a microprogram is closely related to the processing speed of the computer, writing programs at this level simplifies not only software processing but also hardware construction.

In recent years, a bit slice type microprocessor utilizing a high speed bipolar element, and a program sequencer of the same family have been developed. With these LSI, it is possible to effect high speed processing of microprograms and to fabricate a versatile architecture.

Bit slice elements enable a flexible bit construction for a microprogram thereby enabling a user to write a program directly into a microprogram region. The reason for locating the microprogram in the microprogram region is that an extremely high speed data processing can be achieved because the user instruction can be quickly executed at the microprogram level.

However, debugging of such a system involves more difficult problems than the debugging of higher level instruction words in an ordinary memory. Each higher level instruction has a microprogram processing routine for each word so there is sufficient time to make a detailed check for errors. Items being processed include a check of an interruption signal representing a debugging request of an operator. A program counter corresponding to one word of the higher level instruction is also provided and the progress control of the program may be effected by this counter.

In contrast, when debugging a system wherein the user program is described at microprogram levels, since there is no processing routine which is more detailed than the program level, consideration must be given to each microinstruction. This can be readily understood in view of the fact that an operator's debugging request may occur for each and every microinstruction.

The term "operator's request" is used herein to mean read/write, run, address stop, single step operation, etc. of a register utilized in a computation processing. Generally, the debugging of the program can respond to any operator's request provided that the progress address of the program can be saved. The same is true for a flag representing the result of a computation, but since the present invention concerns a microprogram, debugging processing of a flag will not be described. Thus, even when a user program is written in a microprogram region, so long as a program progress address (hereinafter called a next address) can be preserved, debugging of the program can be performed.

SUMMARY OF THE INVENTION

It is an object of this invention to provide a novel microprogram control system capable of readily debugging a microprogram.

According to this invention, there is provided a microprogram control system of the type comprising an electronic computer having a programmable interruption control unit and a debugging microprogram thereby permitting an interruption in terms of one step of the microprogram, characterized in that there are provided a clock control unit, and a program control device which produces an interruption request signal, that a clock is stopped and a state in which a single microstep operation of a program to be debugged is executed by the debugging program, that an interruption request signal is set in the programmable interruption control unit, that a saved address of the program to be debugged is saved when the clock is restarted, and that the single step operation is returned to after an operation request other than the single step operation has been processed so as to continue the single step operation of the program to be debugged.

BRIEF DESCRIPTION OF THE DRAWINGS

In the accompanying drawings:

FIG. 6 is a connection diagram showing the clock control unit.

DESCRIPTION OF THE PREFERRED EMBODIMENT

Figure 1:
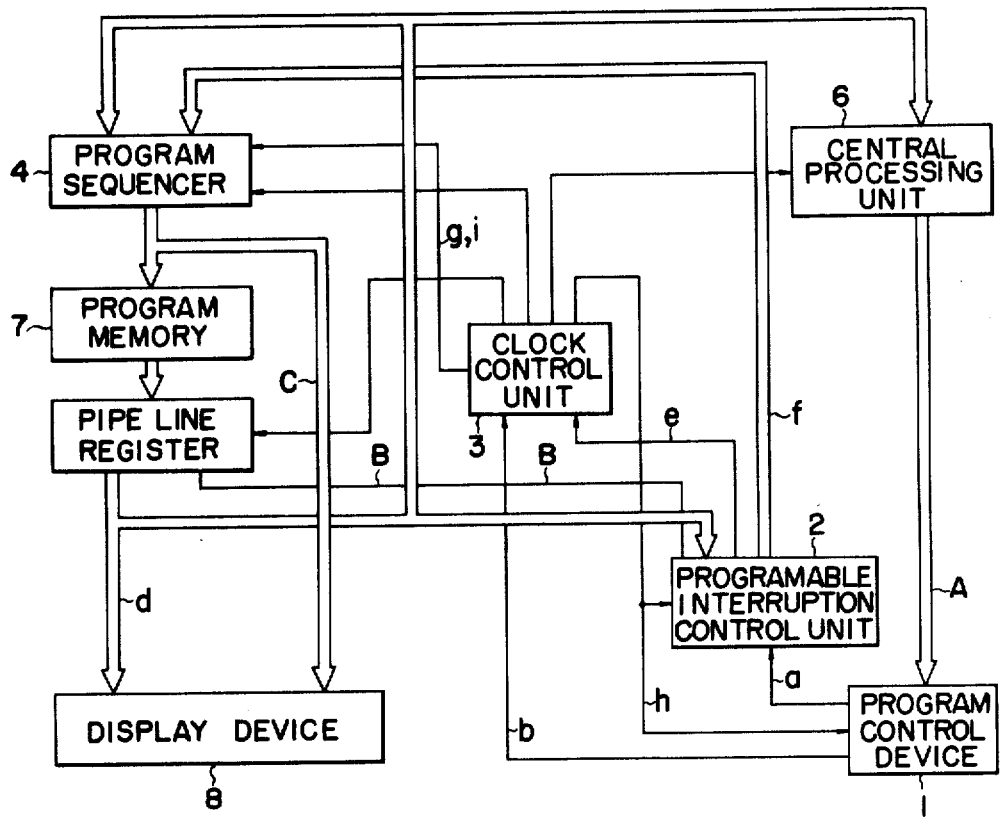
FIG. 1 is a block diagram showing one embodiment of the microprogram control system embodying the invention.

Before describing a preferred embodiment of this invention, a method of saving a next address based on the principle described above will now be outlined with reference to the microprogram control system for microprogram debugging. As described above, a microprogram system utilizing a bit slice element comprises a microprocessor for executing a computation processing of data and a program sequencer for effecting the address control of the microprogram as the basic elements. Usually the program sequencer contains files (in the form of a memory device, i.e., a storage device) at several levels so that upon occurrence of an interruption the program sequencer is controlled so as to reserve the next address. The control system of this invention is provided with means for permitting an intertuption at a microprogram level to debug a user program written at a microprogram level. Thus, when the interruption is allowed the program advances from the 0th address of the microprogram to execute a predetermined interruption routine. When the interruption processing routine is executed, the address of the interrupted instruction is saved in the file of the program sequencer described above.

In this manner, the control system of this invention uses an interrupting structure for preserving the next address. For this reason, it is not necessary to provide additional hardware that preserves the next address. Accordingly, for debugging a continuous program while reserving the next address it is only necessary to operate the interruption control means provided for the control system of this invention.

When incorporating features essential to ordinary debugging, that is a single step operation which executes the user program according to successive instructions, and an operation for displaying the contents of the computation register at any time and for any number of times to investigate the content thereof, it is necessary to use appropriate means. This is mainly caused by the above described construction of the microprogram. According to the debugging control system of this invention the next interruption is set in the last debugging processing routine subsequent to the processing of one operator's request so as to immediately cause an interruption at the time of the next operator's request thereby reserving the next address necessary for performing continuous debugging. Furthermore, according to the debugging control system of this invention, upon completion of one operator's request, the system clock is stopped. The clock thus stopped is started again by the operation of the operator. Thus, the stop and start of the clock correspond to the preparation of an interruption sequence and the initiation of the interruption sequence. Such control of the clock and the interruption sequence are controlled in accordance with the characteristic of the interruption control means of the control system. Stop control of the clock results in the advantage that the state of the system at the time of termination of the operator's request can be observed in a state in which the clock has stopped and the fault of the circuit can be readily examined. Moreover, display of the states can be readily made with luminous diodes (LED's) or the like.

The microprogram control device shown in FIG. 1 comprises a program control device 1 which operates to set an interruption request signal a in a programmable interruption control unit 2 and to control the start and stop of a clock. When the clock is started, the control device 1 offers an interruption, thus debugging the microprogram. When the programmable interruption control unit 2 receives an interruption permission instruction B produced by a pipe line register to be described later while it is set with the interruption request signal a, it sends an interruption sequence start signal e to a clock control device 3 to start the interruption sequence.

As above described, since an interruption begins just at the time of starting the clock, it is necessary to delay the stopping of the clock while the programmable interruption control unit 2 is operating. This operation will be described hereunder with reference to FIG. 2 which shows the construction of the program control device.

Figure 2:
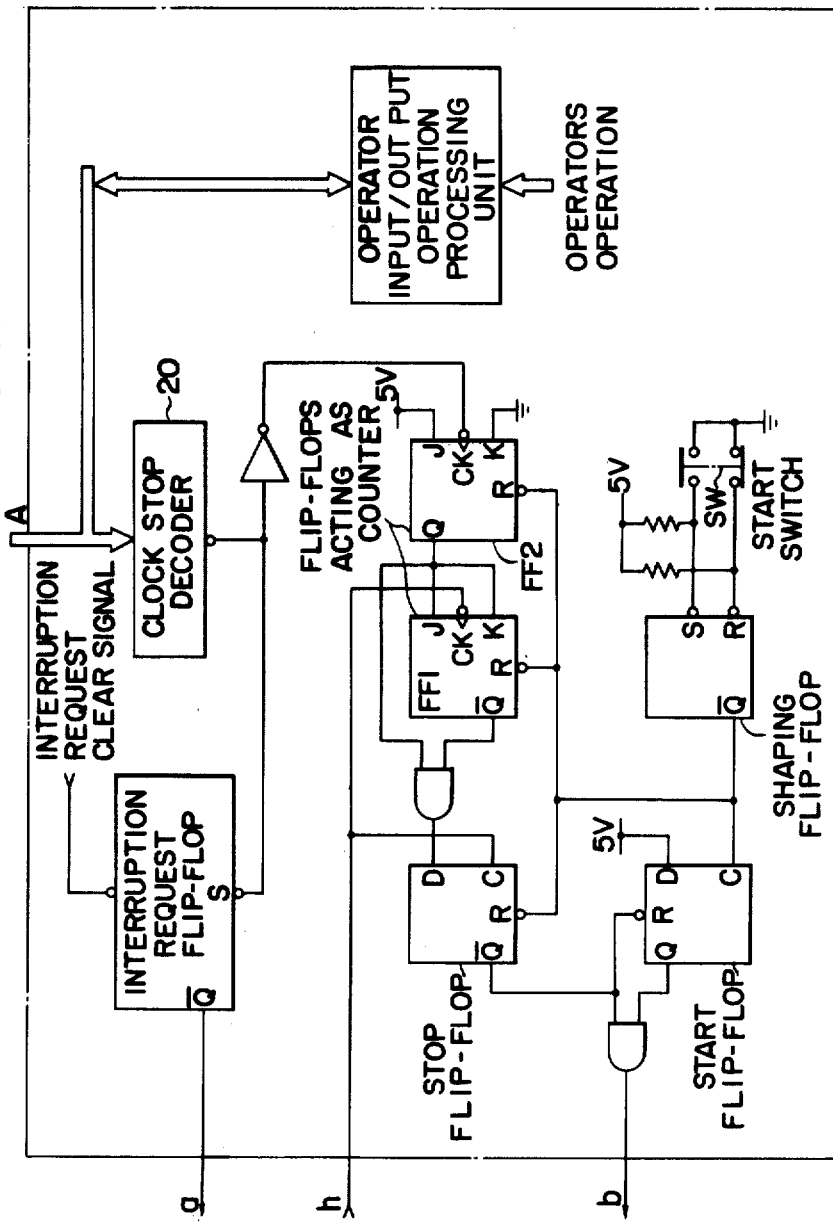
FIG. 2 is a block diagram showing the construction of a program control device.

In FIG. 2 when a program stop instruction A is applied from a central processing unit 6 which may be type AM2901 or AM2901A manufactured by Advanced Micro Devices Co., Ltd. U.S.A. a clock stop instruction decoder 20 produces an interruption request flip-flop set signal and a clock count start set signal b. The program control device also includes a counter comprising two flip-flop circuits FF1 and FF2 and counts two clock signals after receiving the clock count start set signal for delaying the generation of a clock stop signal b until interrupt sequence start signal e is produced by the programmable interruption control unit 2. By such time adjustment, at the time of stopping the clock, preparation for starting the interruption sequence is completed so that it is possible to initiate the interruption concurrently with the restarting of the clock. Turning back to FIG. 1, the clock control unit 3 produces a clock pulse which controls the program control device 1, the programmable interruption control unit 2, a program sequencer 4, a pipe line register 5 and a main processing unit 6. FIG. 6 shows one example of the clock control unit. Upon receipt of a clock stop signal b from the program control device 1, and a pulse generated by an oscillator the clock control unit 3 immediately stops generation of the clock pulses. Furthermore, when the clock control unit 3 receives an interruption start signal e from the programmable interruption control unit 2, it modifies the above-mentioned clock pulses applied to the program sequencer 4, the pipe line register 5, and the central processing unit 6 for processing the interruption. The clock control unit 3 also supplies a zero address start control signal g and an incremental control signal i to the program sequencer 4. The incrementer control signal i is provided for saving the next address into the file within the program sequencer as it is while transferring the program memory address through the incrementer. Generation of the clock pulses is started by a start switch SW shown in FIG. 2 which is operated whenever the operator requests. In the control device shown in FIG. 2, when the start switch SW is depressed, a stop flip-flop circuit is reset whereas a start flip-flop circuit is set when the start switch is released.

The program sequencer 4 supplies a next address c to the program memory device 7 and at the time of the interruption sequence it saves the next address in a file contained in the program sequencer 4. The next address c from the program sequencer 4 and a program content d from the pipe line register 5 are displayed on a display device 8.

Regarding the method for displaying the states, the next address and the program content are sent to the display device, e.g., LED, and displayed. Since the clock pulse is stopped, not only the construction of the display device can be simplified but also faults in the system can readily be found.

Type AM2914 programmable interrupt unit manufactured by Advanced Micro Devices Co., Ltd. U.S.A. is suitable for use as the programmable interruption control unit 2, type AM2909 program sequencer manufactured by the same company is suitable for use as the program sequencer 4 and type AM2918 pipe line register manufactured by the same company is suitable for use as the pipe line register 5.

Figure 3:
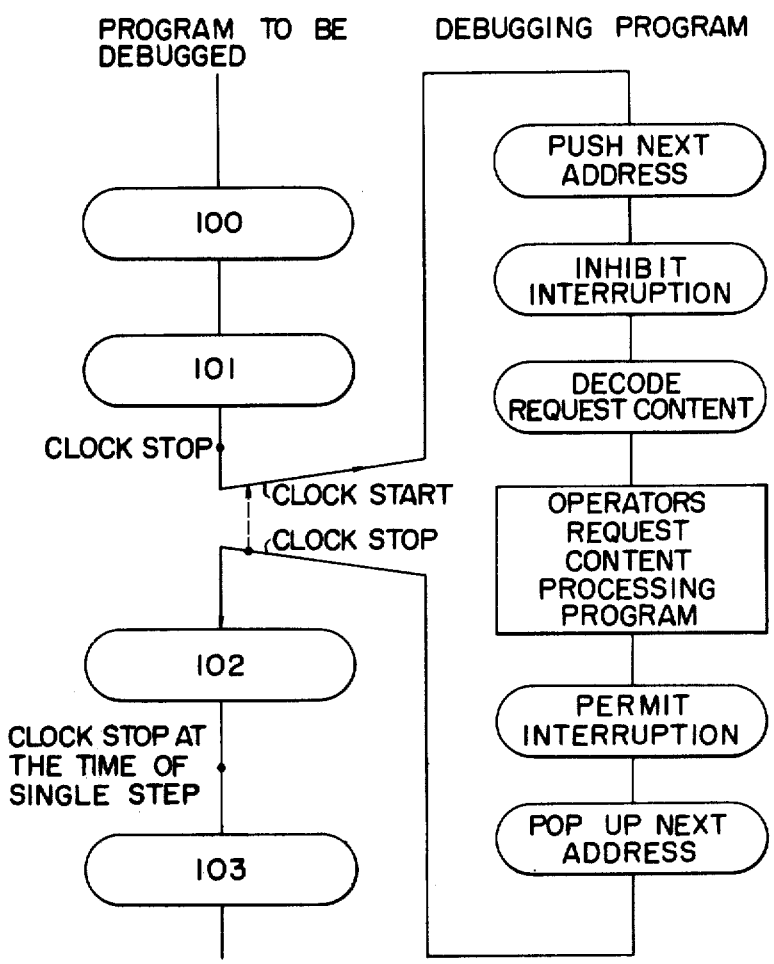
FIG. 3 is a flow chart showing the steps of debugging processing.

Having completed the description of the component elements of the control system, the manner of continuously executing the single step operation while executing an operator's request other than the single step operation is explained as follows. This can be accomplished by saving each next address of a program to be tested by using an interruption while processing the operator's request as shown by the debugging processing flow chart shown in FIG. 3. So long as the next address is saved, it is possible to satisfy the operator's request regardless of the nunber of the requests or change thereof. FIG. 3 also shows that after resaving the next address of the program to be debugged, the single step operation is accomplished by executing one more instruction. This means that the single step operation is accomplished by merely delaying the stop of the clock and the start of the interruption sequence by one instruction at the last processing step of the debugging program. In any case, it is important to start the interruption sequence for saving the next address at the time of starting the clock.

As above described this control is effected by the program control device 1, whereas the preparation of the start of the interruption sequence and the adjustment of the clock stop timing following a clock stop instruction are effected by the clock counter in the program control device. This control sequence is shown by the time chart in FIG. 4. When the programmable interruption control unit 2 receives an interruption permission instruction B after it has been set with an interruption request signal a, the interruption sequence would be started after two instructions have been executed so that a clock stop instruction A is issued before the interruption permission instruction B thus stopping the clock when three instructions including the interruption permission instruction B have been executed.

The counting of the number of the clock pulses h by the counter is effected at the build-down portions and the clock stop signal b is generated at the build-up portions of the next address popping instruction cycle. At the same time, an interruption sequence start signal e is generated. Thereafter, the operator selects a processing mode and then generates the clock pulse by closing the start switch SW so as to save the next address into the file by an interruption processing program which starts from an address zero. To perform a subsequent debugging processing, the interruption process is inhibited and the program jumps to the debug routine under control of an operator generated debug interrupt signal in the form of a vector f. Then the content of the operators request is written into the central processing unit so as to perform individual processings.

Figure 4:
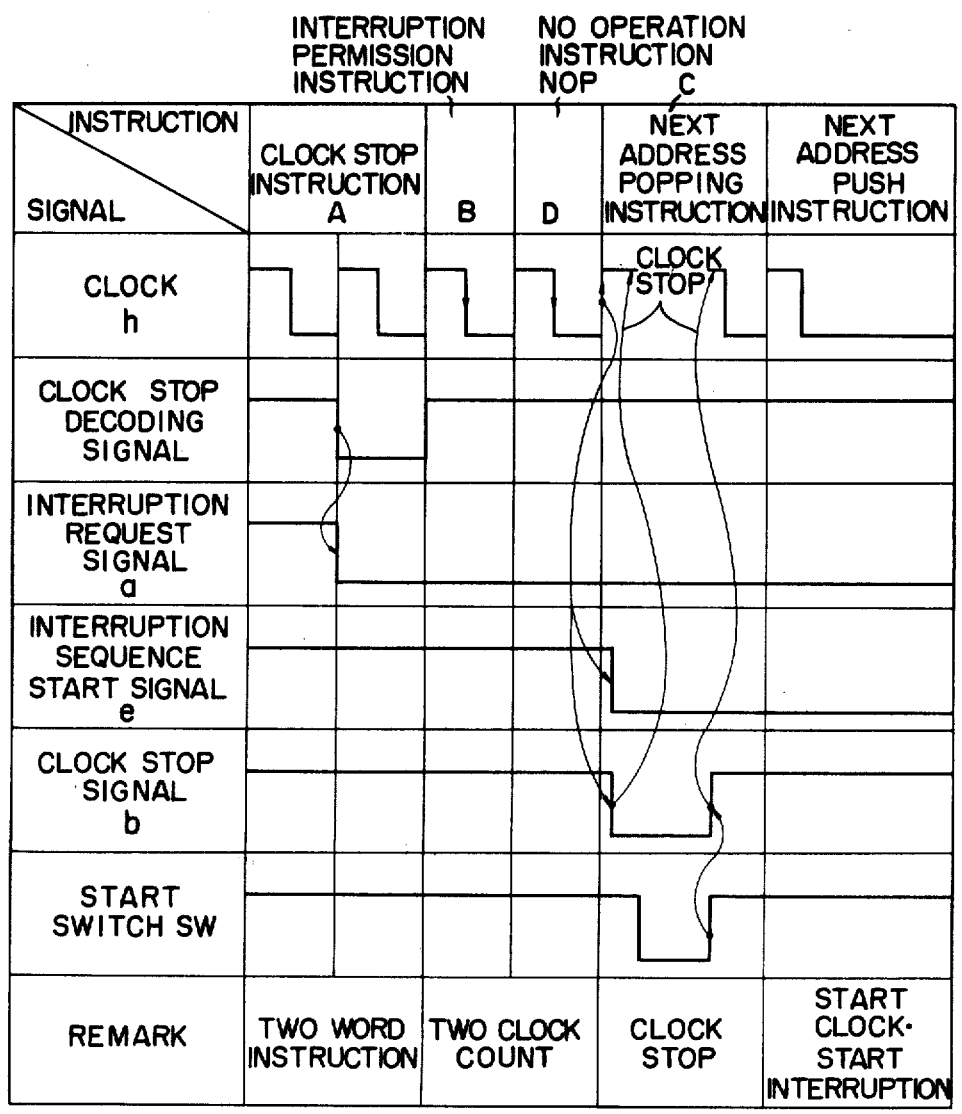
FIG. 4 is a time chart showing clock stop and preparation of the start of an interruption sequence.
Figure 5:
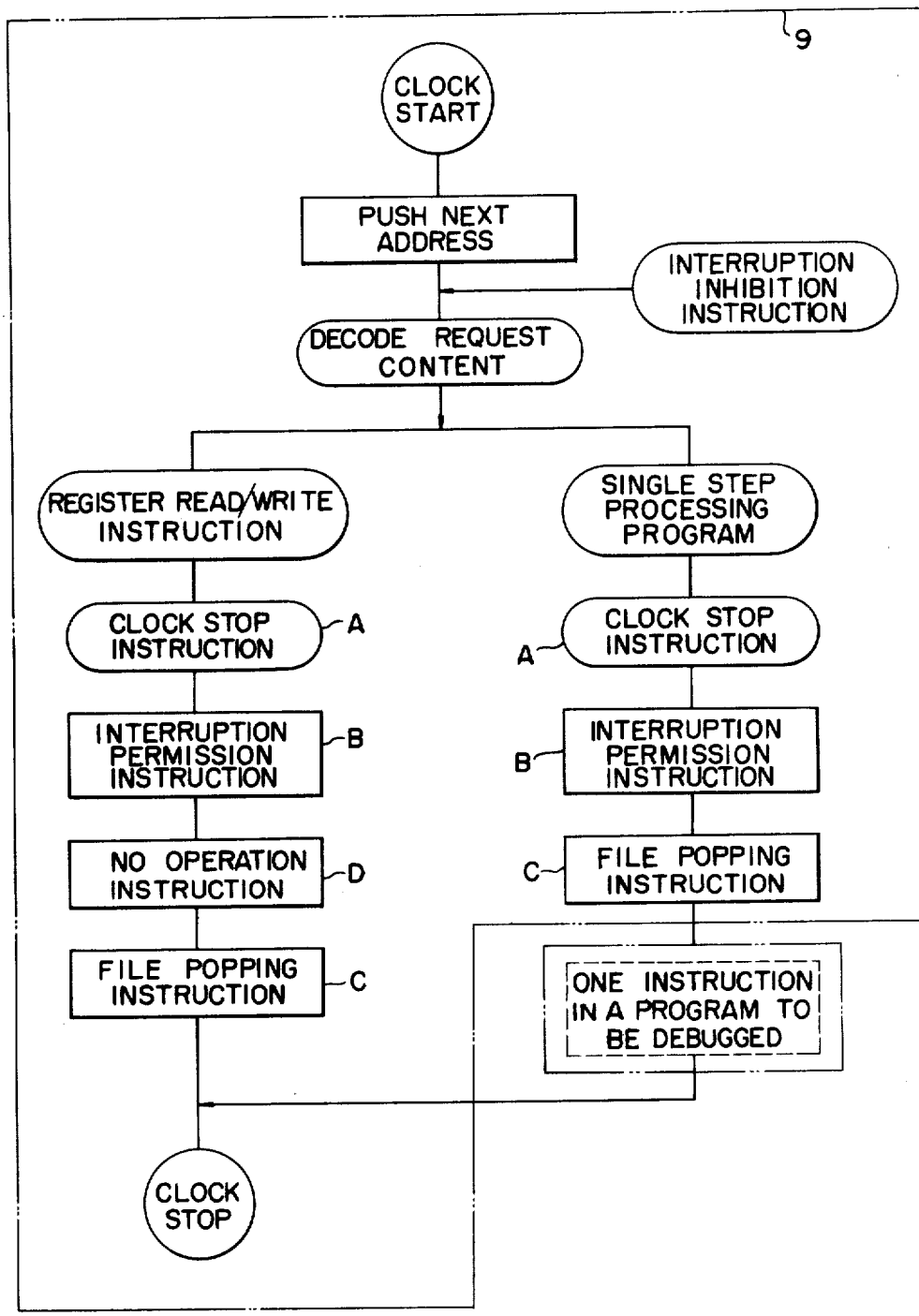
FIG. 5 is a flow chart showing an operation flow.

An actual debugging program corresponding to the preparation of the start of an interruption sequence shown in FIG. 4 is as follows. FIG. 5 is a flow chart showing the operation flow of a debugging program and a program to be debugged before and after starting a clock stop signal at a single step mode and an operator's request mode different therefrom in which a reference numeral 9 designates a debugging program.

In the single step mode shown as the right branch of the program, an interruption permission instruction B is generated after a clock stop instruction, and after resaving the next address in the file popping instruction C, one instruction of a program to be debugged is executed and then the program is terminated. Thus, in response to instruction A, three instructions are executed. On the other hand, in a mode other than the single step mode, the processing of which is similar to the single step mode, being shown as the left branch of the FIG. 5 flow chart, the operation flow is controlled by instructions A and B. With this mode, however, as it is necessary to save respective next addresses, the program is stopped when the file popping instruction C is executed.

In this case, following the interruption permission instruction B, two instructions are executed to stop the program as if hardwares were used, different from the case of the single mode, one no operation instruction D is included. In each mode, whether single step or a mode other than single step, the interruption permission instruction B is generated prior to the clock stop and since the instruction B and the clock stop position are adjusted in accordance with the performance of the programmable interruption control device 2, the next address will be saved into the file concurrently with the generation of the clock pulse.

According to the operation flow shown in FIG. 5, the program can be stopped at any desired step by the clock stop instruction A. More particularly, it is possible to stop the clock pulse when the program to be debugged has been executed by one instruction in the case of the single step mode whereas in a mode other than the single step mode when the next address is resaved. Moreover, as it is possible to save the next address concurrently with the generation of the clock pulse effected by the interruption permission instruction it is possible to process a plurality of consecutive operator's requests while the single step operation of the program to be debugged is being executed.

As above described, according to this invention, a simple program control device is provided for a computer system comprising a programmable instruction control device and an interruption device of a microprogram level for enabling a single step operation and stopping the clock. Accordingly, it becomes possible to display the program and the next address thereby decreasing the hardware necessary for debugging.

I claim:

1. A microprogram control system for debugging microprograms comprising:

a central processing unit including memory means storing a debugging microprogram and a microprogram to be debugged, said debugging program enabling execution of a single microstep of said microprogram to be debugged as well as an operators processing request other than said single microstep execution, a clock control unit for controllably generating clock signals which control operation of said central processing unit, a program control device, a programmable interruption control unit, and a program sequencer, said program control device being responsive to a stop instruction from said central processing unit for producing an interruption request signal, and for providing a control signal to said clock control unit to cause said clock control unit to stop generating clock signals, said program control device also controlling said clock control unit to start the supply of clock signals to permit execution of said debugging microprogram as part of an interruption routine, said debugging microprogram executing a single microstep operation of said program to be debugged or executing an operator's request other than said single microstep operation, and then returning to a single microstep operation of said program to be debugged, said programmable interruption control unit being responsive to said interruption request signal and an interruption permission signal for providing an interruption sequence start signal to said clock control unit to condition said clock control unit for operation in an interruption sequence, and said program sequencer communicating with said central processing unit and including a storage device, said program sequencer saving the next address of said program to be debugged into said storage device upon starting of said clock signals.

2. The microprogram control system according to claim 1 wherein said clock control unit produces a zero address start control signal which is applied to program sequencer, said program sequencer supplies a program processing address to said memory means and saves said address in said storage device upon starting of said clock signals, said program control device applies an interruption request signal to said programmable interruption control device and a clock stop signal to said clock control unit in response to said stop instruction and starts said supply of clock signals in response to an operator request signal, and said memory means is connected to said program sequencer to receive a program processing address therefrom, said control system further comprising a pipe line register connected to receive clock signals and to said memory means for storing a program content and for applying said interruption permission signal to said programmable interruption control unit, a start switch contained in said program control device and operated by an operator for starting the operation of said clock control unit, and a display device for displaying said address contained in said program sequencer and a program content supplied from said pipe line register.

* * * * *